United States Patent
Lim et al.

(10) Patent No.: US 8,345,608 B2
(45) Date of Patent: Jan. 1, 2013

(54) SYSTEM AND METHOD FOR TRANSMITTING DOWNLINK SCHEDULE IN WIMAX/WIBRO RELAY SYSTEM

(75) Inventors: Eun-Taek Lim, Gyeonggi-do (KR); Qi Wu, Beijing (CN); Hyoung-Kyu Lim, Seoul (KR); Pan-Yuh Joo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 164 days.

(21) Appl. No.: 12/451,143

(22) PCT Filed: Apr. 14, 2008
(Under 37 CFR 1.47)

(86) PCT No.: PCT/KR2008/002100
§ 371 (c)(1),
(2), (4) Date: Apr. 26, 2010

(87) PCT Pub. No.: WO2008/133416
PCT Pub. Date: Nov. 6, 2008

(65) Prior Publication Data
US 2010/0284322 A1   Nov. 11, 2010

(30) Foreign Application Priority Data
Apr. 27, 2007   (CN) .......................... 2007 1 0097589

(51) Int. Cl.
H04W 4/00    (2009.01)
H04J 1/10    (2006.01)
H04J 3/18    (2006.01)
H04B 7/14    (2006.01)

(52) U.S. Cl. ........ 370/329; 370/315; 370/341; 370/346; 455/450; 455/452.2

(58) Field of Classification Search .................. 370/229, 370/230, 230.1, 236, 259, 310, 310.2, 315, 370/329, 341–350, 431; 455/450, 451, 452.2, 455/453, 522
See application file for complete search history.

(56) References Cited

U.S. PATENT DOCUMENTS

| | | | |
|---|---|---|---|
| 7,894,388 B2* | 2/2011 | Visotsky ........................ | 370/329 |
| 2008/0056172 A1* | 3/2008 | Nakatsugawa ................ | 370/315 |
| 2008/0103355 A1* | 5/2008 | Oleszcsuk ..................... | 455/442 |
| 2008/0165719 A1* | 7/2008 | Visotsky ........................ | 370/315 |
| 2008/0220790 A1* | 9/2008 | Cai et al. ....................... | 455/450 |
| 2008/0267110 A1* | 10/2008 | Cai et al. ....................... | 370/315 |
| 2009/0307484 A1* | 12/2009 | Zhang et al. .................. | 713/153 |

FOREIGN PATENT DOCUMENTS

| | | |
|---|---|---|
| EP | 1725061 A2 | 11/2006 |
| EP | 1734774 A1 | 12/2006 |
| EP | 1773091 A2 | 4/2007 |
| KR | 10-2006-0135572 A | 12/2006 |

OTHER PUBLICATIONS

International Search Report dated Aug. 21, 2008 in connection with PCT Patent Application No. PCT/KR2008/002100.
Written Opinion of the International Searching Authority dated Aug. 21, 2008 in connection with PCT Patent Application No. PCT/KR2008/002100.

* cited by examiner

Primary Examiner — Habte Mered

(57) ABSTRACT

A system and method for transmitting downlink schedule in a WiMax/WiBro relay system is proposed in present invention. In present invention, the task of transmitting the schedule is dispersed from the BS to both of the BS and RS so that several RS may transmit the schedule items simultaneously and therefore the resource of the system is saved.

19 Claims, 3 Drawing Sheets

[Fig. 1]
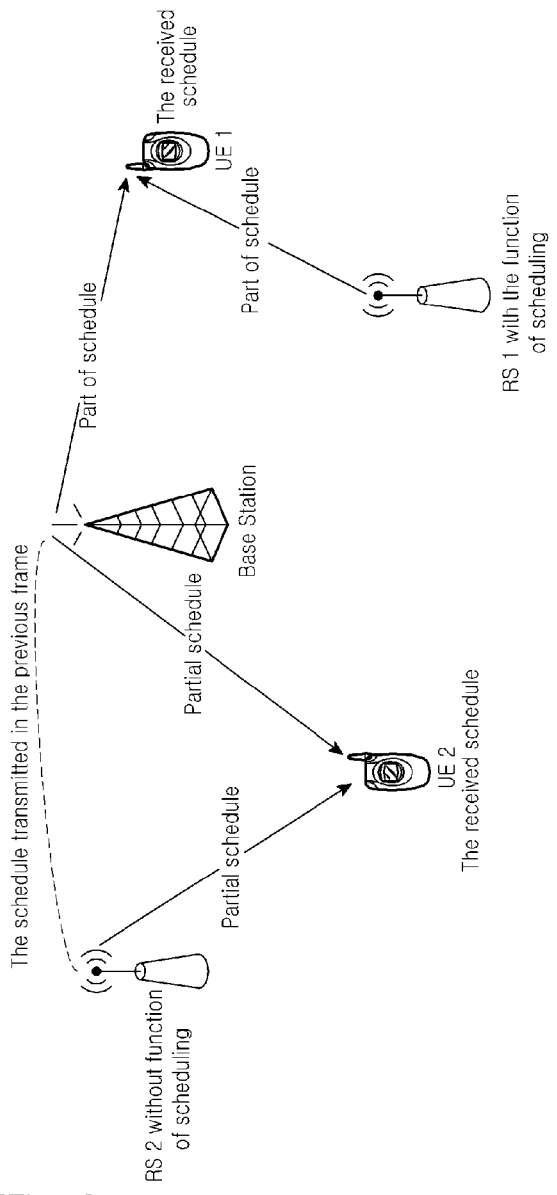
[Fig. 2]
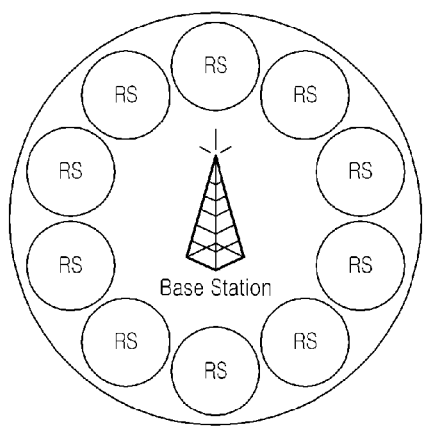

[Fig. 3]
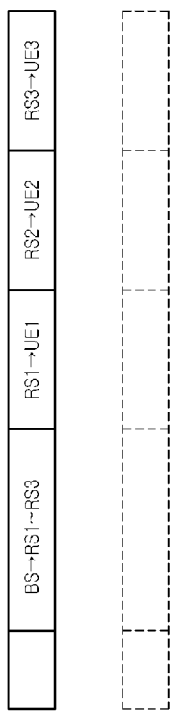
[Fig. 4]
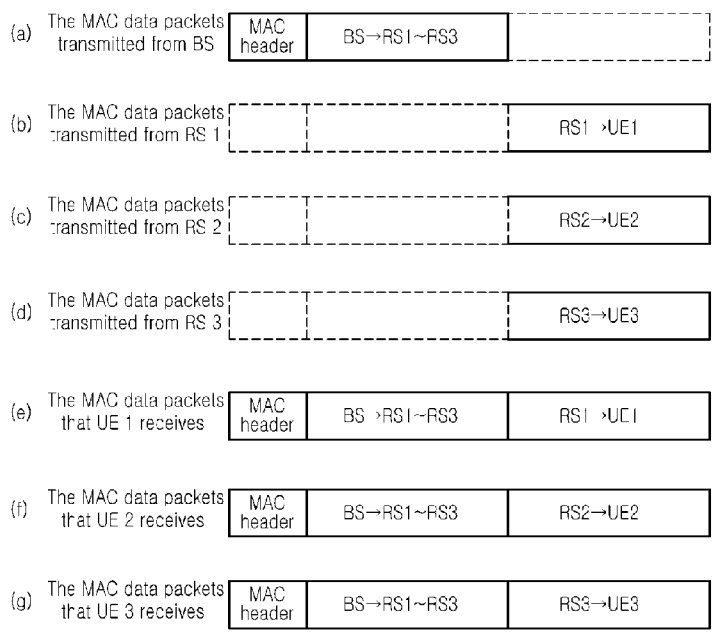

[Fig. 5]
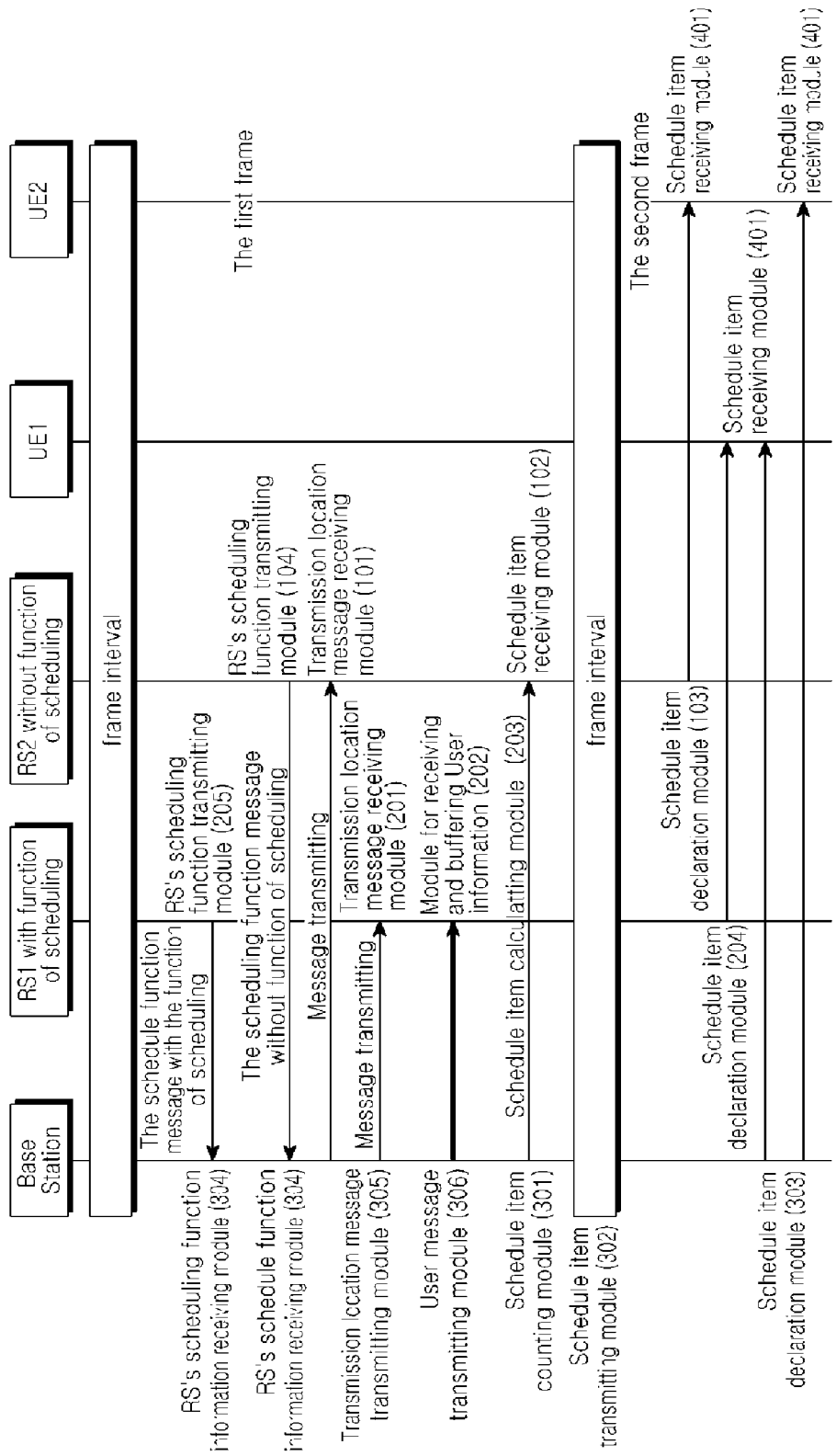

SYSTEM AND METHOD FOR TRANSMITTING DOWNLINK SCHEDULE IN WIMAX/WIBRO RELAY SYSTEM

TECHNICAL FIELD

The present invention relates to a relay cell system, especially to a system and method for transmitting a downlink schedule in a WiMax/WiBro relay system.

BACKGROUND

In a conventional WiMax/WiBro system, it is necessary for a BS to transmit a schedule in a header of each frame so that users may receive or transmit data at some location. In general, this schedule should be decoded by any user even the user with worse channel quality in a cell. Thus, the schedule is processed with lower level of modulation and encoding scheme and retransmitted for several times.

SUMMARY OF THE INVENTION

With introduction of relay, a space multiplexing scheme is mostly adopted between relay stations to make full use of the system's frequency resource, i.e., several relay stations may simultaneously transmit or receive data, as shown in FIG. 2. In this way, several data or control messages are transferred in a cell at some time. Therefore, items of the schedule in each frame increases with the increasing of relays. Since a schedule is usually processed with lower level of modulation and encoding scheme and retransmitted for several times, it occupies more system frequency resources than data transmission. It is necessary to adopt a more effective method to transmit the schedule so as to reduce the resource increased for transmitting the schedule with the increasing of relays.

A system and method for transmitting a schedule in a WiMax/WiBro relay system is provided in present invention. In this method, a task of transmitting the schedule is dispersed from the BS to both of BS and RSs so that several RSs may transmit the schedule items simultaneously and therefore the resource of the system is saved.

To achieve the object mentioned above, a system for transmitting a schedule in a WiMax/WiBro relay system comprising:

a relay scheduling function information module in a BS, for receiving relay scheduling function information transmitted from a relay scheduling function transmitting module in a RS with or without a function of scheduling, the information indicating whether a RS bears the function of scheduling or not;

a transmission location information transmitting module in the BS, for transmitting the transmission location information on a schedule for the next frame to a transmission location information receiving module of the RS with or without the function of scheduling;

a user information transmitting module in the BS, for transmitting the user information to the RS with the function of scheduling;

an item calculating module in the BS for calculating schedule items for all links except for the links between the RSs with the function of scheduling and the relay user in the cell;

a schedule item calculating module in the RS with the function of scheduling for calculating items needed to be transmitted in the next frame to user;

a schedule item transmitting module in the BS for transmitting the schedule items from the RS to a RS without function of scheduling in the next frame to users of the RS without the function of scheduling;

wherein the BS, schedule item declaration modules with or without the function of scheduling simultaneously transmit their own schedule items to users, in frequency domain, the BS transmits the schedule items via some sub-channels and a plurality of RSs transmit schedule items via other sub-channels.

In present invention, the task of transmitting the schedule is dispersed from the BS to both of the BS and RSs so that several RSs may transmit the schedule items simultaneously and therefore the resource of system is saved.

BRIEF DESCRIPTION OF THE DRAWINGS

FIG. 1 illustrates a process that BS, the RSs with or without the function of scheduling cooperatively implements the transmission of schedule effectively;

FIG. 2 illustrates space multiplexing for RSs resulted from that several RSs simultaneously transmit data to users;

FIG. 3 illustrates in one mode of in transmitting a downlink schedule;

FIG. 4 illustrates a high effective mode in transmitting a downlink schedule;

FIG. 5 illustrates a message flow in the process that BS, the RSs with or without the function of scheduling cooperatively implement the transmission of schedule effectively.

DETAILED DESCRIPTION

In the structure of present invention, the relay end without the function of scheduling includes following modules:

Transmission location information receiving module 101 that receives a transmission location information message from a BS. With this message, the RS obtains where (for example, in which one of the OFDMA time frequency grid) the schedule items are transmitted in the next frame. After the RS receives this message, it records the transmission location for subsequent frames in the transmission of schedule items. Before this message indicating the next transmission location is not received, the transmission location is kept unchanged;

Schedule item receiving module 102 that receives the schedule item message sent from the schedule item transmitting module 302 in the BS. This message indicates the schedule needed to transmit in the next frame for this RS;

Schedule item declaration module 103 that transmits the schedule item message received by the relay schedule item receiving module 102 in the previous frame via the recorded transmission location;

Relay scheduling function transmitting module 104 that transmits the information to the BS, indicating that it has no function of scheduling.

The relay end with the function of scheduling includes following modules:

Transmission location information receiving module 201 that receives the transmission location information from BS. With this message, the RS obtains where (for example, in which one of the OFDMA time frequency grid) the schedule items are transmitted in the next frame. After the RS receives this message, it records the transmission location for subsequent frames in the transmission of schedule items. Before the message indicating the next transmission location is not received, the transmission location is kept unchanged;

Module 202 that can receive and buffer user information, which receives the messages indicating a destination address from the BS for the relay user, and then buffers them;

Schedule item calculating module 203 that calculates the schedule items that are necessary to transmit to users according to the buffered messages;

Schedule item declaration module 204 that transmits the schedule items obtained by the schedule item calculating module 203 via the recorded transmission location;

Relay scheduling function transmitting module 205 that transmits the information to BS, indicating that it bears function of scheduling.

BS includes following modules:

Schedule item calculating module 301 that calculates the schedule items for all links except for the links between the RSs with the function of scheduling and the relay user in the cell;

Schedule item transmitting module 302 that can transmit the schedule items which from the RS without the function of scheduling to the user of the relay in the next frame to the RS in the current frame;

Schedule item declaration module 303 that transmits the schedule items in current frame to RSs and the users;

Relay scheduling function information receiving module 304 that receives the scheduling function information from RSs so as to know whether the RS has the scheduling function or not;

Transmission location information transmitting module 305 that transmits the transmission location message of the relay schedule to the RS. In this message, the location (i.e., in which one of the OFDMA time frequency grid) is specified in the next frame for transmitting the schedule items;

User information transmitting module 306 that transmits the user information on the destination address to the RS. These messages are forwarded to the users through the RS.

The user end includes following modules:

Schedule item receiving module 401 that receives the schedule items via the locations specified in the system.

Based on the structure above, high effective transmission of downlink schedule is implemented cooperatively by BS and RS, as shown in FIG. 1.

FIG. 5 illustrates an example message transmission process.

In one example, there are one BS and two RSs (for example, RS1 and RS2) in a cell, in which RS1 includes the function of schedule and RS2 does not include a scheduling function; and two users (for example, user1 and user2). Detailed steps that high effective transmission of downlink schedule is implemented cooperatively by BS and RS, as shown in FIG. 5:

Step 1. in the first frame, the relay scheduling function transmitting module 205 in RS1 transmits the scheduling function message to the BS, indicating that RS1 has the function of scheduling;

Step 2. in the first frame, the relay scheduling function information receiving module 304 in the BS receives the scheduling function message from RS1 to know that RS1 has the function of, scheduling;

Step 3. in the first frame, the relay scheduling function transmitting module 104 in RS2 transmits the scheduling function message to the BS, indicating that RS2 has no function of scheduling;

Step 4. in the first frame, the relay scheduling function information receiving module 304 in the BS receives the scheduling function message from RS2 to know that RS2 has no function of scheduling;

Step 5. in the first frame, the transmission location message transmitting module 305 in the BS transmits the message indicating the transmission location of schedule in the next frame to RS1 and RS2;

Step 6. in the first frame, the transmission location message receiving module 201 in RS1 receives the transmission location message from BS and records it;

Step 7. in the first frame, the transmission location message receiving module 101 in RS2 receives the transmission location message from BS and records it;

Step 8. in the first frame, the user information transmitting module 306 in the BS transmits the user information to RS1;

Step 9. in the first frame, the user information receiving and buffering module 202 in RS1 receives the transmission user information from BS and buffers it;

Step 10. in the first frame, the schedule item calculating module 301 in the BS calculates the schedule items (in the next frame, for example, the second frame) for all links except the ones between the RSs which bear function of scheduling and the relay user in the cell;

Step 11. in the first frame, the schedule item calculating module 203 in RS1 calculates the schedule items needed to be transmitted to users via the next frame (for example, the second frame);

Step 12. in the first frame, the schedule item transmitting module 302 in the BS transmits the schedule items (from RS2 to the users of RS2) to RS2 via the next frame (for example, the second frame);

Step 13. in the first frame, the schedule item receiving module 102 in RS2 receives the schedule items (from RS2 to the users of RS2) from BS via the next frame (for example, the second frame) and records them;

Step 14. in the second frame, the schedule item declaration modules (i.e., 301, 204 and 103) in the BS, RS1 and RS2 simultaneously transmits their own schedule items, where the location (for example, the OFDMA time frequency unit grid) of the broadcast schedule item of RS1 or RS2 is the one recorded in the first frame;

Step 15. in the second frame, the schedule item receiving module 401 of user1 receives the schedule items from both BS and RS1 so as to obtain the schedule items in current frame;

Step 16. in the second frame, the schedule item receiving module 401 of user2 receives the schedule items from both BS and RS2 so as to know about the schedule items in current frame.

In an illustrative example a cell has one BS, three RSs (for example, RS1, RS2 and RS3) and three users (for example, user1, user2 and user3). Three messages should be transmitted from BS to user1, user2 and user3 respectively on the premise that the message to user1 should be relayed by RS1 the message to user2 by RS2 and the message to user3 by RS3. In this case, it is necessary for the BS to broadcast six (6) schedule items: (1) BS→RS1; (2) BS→RS2; (3) BS→RS3; (4) RS1→user1; (5) RS2→user2; (6) RS3→user3.

FIG. 3 shows a PDU structure of MAC in one mode of transmitting the downlink schedule with a dash part indicating that the transmission is not implemented. In this figure, all six (6) schedule items should be transmitted by the BS. Meanwhile, all users have received the PDU that contains the six (6) schedule items.

FIG. 4 shows a process of transmitting the schedule items with the high effective transmission method according to present invention. Here, FIG. 4A shows the content that BS needs to transmit. It should be noted that BS transmits only the MAC header and the three schedule items which are from BS to RSs. FIGS. 4B through 4D respectively show the transmission content of RS1, RS2 and RS3. Each RS transmits the corresponding schedule items to users. Different sub-channels are adopted by BS and RSs to transmit the schedule items. The three RSs share the same sub-channels to transmit the schedule items. Since the three RS are told apart spatially, the PDUs received by user1, user2 and user3 are illustrated in FIGS. 4E through 4G respectively.

From the comparison between FIG. 3 and FIGS. 4A-4G, it will be seen that each user in FIG. 3 has received the same PDU of six (6) schedule items, and each user in FIGS. 4A-4G has received PDUs (which are partially consistent) of four (4) schedule items. Suppose one OFDMA time frequency grid is used for the MAC header and one schedule item, seven OFDMA time frequency grids are needed to transmit the schedule in the conventional method, while only five (5) OFDMA time frequency grids are needed in the high effective transmission method. In practice, with the increment of schedule items occupied by RSs, more system resource will be saved by the high effective transmission method.

The invention claimed is:

1. A system for use in a WiMax/WiBro relay system, the system comprising:
   a Base Station (BS) capable of communicating with at least two Relay Stations (RS), the BS configured to identify the whether a first RS bears a function of scheduling; transmit transmission location information indicating a location where schedule items are transmitted in a next frame to the first RS; transmit the schedule items for the next frame to a second RS without a function of scheduling; and transmit the schedule items to users in the next frame,
   wherein transmission of the schedule items from the BS to the users occurs in a same frame interval as transmission of respective schedule items from the first RS and the second RS to the users, and wherein the transmission of the schedule items from the BS to the users occurs in a frequency domain and via some sub-channels different from other sub-channels used by the first RS and the second RS to transmit the respective schedule items to the users.

2. The system according to claim 1, wherein the BS further is configured to transmit to the first RS transmission location information indicating the location where the schedule items are transmitted in the next frame.

3. The system according to claim 1, wherein the BS is further configured to receive relay scheduling function information transmitted from the first RS, the relay scheduling function information indicating whether the first RS bears the function of scheduling or not.

4. The system according to claim 1, wherein the BS is configured to transmit user information to the first RS in response to the BS determining that the first RS includes the function of scheduling.

5. The system according to claim 1, wherein the BS is further configured to calculate schedule items for a plurality of links except for a link between the first RS with the function of scheduling and a user of the first RS in a cell of the BS.

6. A system for use in a WiMax/WiBro relay system, the system comprising:
   a Relay Station (RS) capable of communicating with at least one Base Station (BS), the RS configured to transmit scheduling function information to the at least one BS, the scheduling function information configured to indicate if the RS includes a function of scheduling; receive transmission location information indicating a location where schedule items are transmitted in a next frame; transmit schedule items to a user of the RS in the next frame, wherein the RS is configured to transmit the schedule items to the user, in frequency domain, in a same frame interval as when the at least one BS transmits the schedule items to the user; and transmit the schedule items via a first set of sub-channels wherein the at least one BS transmits the schedule items via a second set of sub-channels.

7. The system according to claim 6, wherein the RS includes the function of scheduling and wherein the RS is further configured to calculate the schedule items needed to be transmitted in the next frame to the user.

8. The system according to claim 6, wherein the user receives the schedule items from the at least one BS, the RS with the function of scheduling and the second RS without the function of scheduling.

9. The system according to claim 6, wherein the RS is further configured to record the transmission locations information from the BS.

10. The system according to claim 6, wherein the RS includes the function of scheduling, and wherein the RS is further configured to receive and buffer the user information.

11. A method for transmitting a schedule in a WiMax/WiBro relay system, the method comprising:
   receiving, by a Base Station (BS), relay scheduling function information transmitted from at least two Relay Stations (RSs), the relay scheduling function information indicating whether the at least two RSs bear the function of scheduling or not;
   determining whether the at least two RSs includes a function of scheduling;
   transmitting, by the BS, transmission location information indicating a location where schedule items are transmitted in a next frame to the at least two RSs;
   transmitting, by the BS, the schedule items to a first RS without function of scheduling of the at least two RSs; and
   transmitting, by the BS, the schedule items to users in the next frame, wherein the transmission of the schedule items from the BS to the users occurs in a same frame interval as a transmission of respective schedule items from the at least two RSs to the users, and wherein the transmission of the schedule items from the BS to the users occurs in a frequency domain and via some sub-channels different from other sub-channels used by the at least two RSs to transmit the respective schedule items to the users.

12. The method according to claim 11 further comprising: transmitting, by the BS, user information to a second RS when the second RS includes the function of scheduling.

13. The method according to claim 11 further comprising: responsive to determining that a second RS includes the function of scheduling, calculating, by the BS, schedule items for all links except for a link between the second RS and a user of the second RS.

14. The method according to claim 13, wherein the BS calculates the schedule items for the next frame in current frame.

15. The method according to claim 11 wherein the users receive the schedule items via locations specified by the BS.

16. The method according to claim 11, wherein the first RS without the function of scheduling records the schedule items received from the BS.

17. The method according to claim 11, wherein a second RS with the function of scheduling buffers the user information received from the BS.

18. The method according to claim 17, wherein the second RS with the function of scheduling calculates schedule items for the next frame according to the buffered data.

19. The method according to claim 11, wherein a second RS with the function of scheduling transmits the schedule items via the original location before a new location is specified by the BS.

* * * * *